(12) United States Patent
Yokoyama et al.

(10) Patent No.: US 10,207,332 B2
(45) Date of Patent: Feb. 19, 2019

(54) WORK HOLDER AND WORK MACHINING METHOD

(71) Applicant: JTEKT CORPORATION, Osaka-shi, Osaka (JP)

(72) Inventors: Takashi Yokoyama, Seto (JP); Masami Narisawa, Kitakatsuragi-gun (JP); Shogo Kuroyanagi, Okazaki (JP); Yoshinobu Shichiri, Hikone (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/659,739

(22) Filed: Jul. 26, 2017

(65) Prior Publication Data

US 2018/0029137 A1    Feb. 1, 2018

(30) Foreign Application Priority Data

Jul. 29, 2016  (JP) ................................. 2016-149855
May 26, 2017  (JP) ................................. 2017-104559

(51) Int. Cl.
| | |
|---|---|
| *B23B 31/28* | (2006.01) |
| *B23B 31/10* | (2006.01) |
| *B23Q 3/152* | (2006.01) |
| *B23B 31/22* | (2006.01) |
| *B24B 5/28* | (2006.01) |

(52) U.S. Cl.
CPC ............ *B23B 31/28* (2013.01); *B23B 31/101* (2013.01); *B23Q 3/152* (2013.01); *B23B 31/223* (2013.01); *B23B 2215/12* (2013.01); *B23B 2228/24* (2013.01); *B23B 2260/10* (2013.01); *B23B 2270/38* (2013.01); *B24B 5/28* (2013.01); *Y10T 279/10* (2015.01); *Y10T 279/17461* (2015.01); *Y10T 279/23* (2015.01); *Y10T 279/26* (2015.01); *Y10T 279/29* (2015.01); *Y10T 279/32* (2015.01)

(58) Field of Classification Search
CPC ..... B23B 31/28; B23B 31/101; Y10T 279/23; Y10T 279/26; Y10T 279/29; B23Q 3/152
See application file for complete search history.

(56) References Cited

U.S. PATENT DOCUMENTS

| | | | | |
|---|---|---|---|---|
| 2,228,195 | A | * | 1/1941 | Blood .................. B23Q 3/1546 279/128 |
| 2,360,928 | A | * | 10/1944 | Beechlyn ................ B23B 31/28 279/128 |
| 2,741,481 | A | * | 4/1956 | Ortegren ................ B23B 31/18 269/8 |

(Continued)

FOREIGN PATENT DOCUMENTS

| | | | |
|---|---|---|---|
| DE | 102009047996 B3 * | 3/2011 | ........... B23B 31/101 |
| FR | 447354 A * | 12/1912 | ............. B23B 31/28 |
| JP | 2015-136741 A | 7/2015 | |

OTHER PUBLICATIONS

Merriam-Webster online dictionary, Aug. 2018, https://www.merriam-webster.com/dictionary/attract.*

*Primary Examiner* — Eric A Gates
(74) *Attorney, Agent, or Firm* — Oliff PLC

(57) ABSTRACT

A work holder includes: a first holding part having three attracting members that are arranged circumferentially apart from each other to attract an axial end face of an annular work; and a second holding part having a contacting member that is held in contact with an inner periphery or outer periphery of the work and restricts radial movement of the work.

10 Claims, 8 Drawing Sheets

(56) References Cited

U.S. PATENT DOCUMENTS

| | | | | | |
|---|---|---|---|---|---|
| 2,769,642 | A | * | 11/1956 | Berry | B23Q 3/1543 |
| | | | | | 279/128 |
| 2,987,924 | A | * | 6/1961 | Karrels | F16F 15/32 |
| | | | | | 279/128 |
| 3,700,250 | A | * | 10/1972 | Bautz | B23B 31/18 |
| | | | | | 269/238 |
| 5,441,284 | A | * | 8/1995 | Mueller | B23B 31/207 |
| | | | | | 279/132 |
| 5,464,233 | A | * | 11/1995 | Hanai | B23B 31/16229 |
| | | | | | 279/106 |
| 5,503,508 | A | * | 4/1996 | Amiguet | B23B 31/4006 |
| | | | | | 269/24 |
| 6,123,341 | A | * | 9/2000 | Oki | B23B 31/16254 |
| | | | | | 279/127 |
| 7,415,766 | B2 | * | 8/2008 | Luschei | B23B 1/00 |
| | | | | | 279/133 |
| 8,359,727 | B2 | * | 1/2013 | Dolp | B23B 31/19 |
| | | | | | 279/133 |
| 9,061,357 | B2 | * | 6/2015 | Ogawa | B23B 31/16233 |
| 2007/0227318 | A1 | * | 10/2007 | Biertz | B23Q 3/063 |
| | | | | | 82/150 |
| 2007/0246875 | A1 | * | 10/2007 | Sammartin | B23B 31/16116 |
| | | | | | 269/8 |

* cited by examiner

RADIALLY OUTSIDE

RADIALLY INSIDE

WORK HOLDER AND WORK MACHINING METHOD

INCORPORATION BY REFERENCE

The disclosure of Japanese Patent Application No. 2017-104559 filed on May 26, 2017 including the specification, drawings and abstract is incorporated herein by reference in its entirety.

BACKGROUND

1. Technical Field

The disclosure relates to a work holder that is applied to a machining apparatus that is used to machine annular works, and a work machining method.

2. Description of Related Art

For example, outer and inner rings of rolling bearings are subjected to surface finishing during the manufacturing process in order to improve dimensional accuracy of their inner and outer peripheries and axial end faces. In general, a grinding apparatus is used for surface finishing, and an apparatus is known as a grinding apparatus for this purpose in which a grinding wheel grinds an annular work with one of the axial end faces being attracted to a magnetic chuck and its outer periphery being supported by a plurality of shoes (refer to Japanese Patent Application Publication No. 2015-136741 (JP 2015-136741 A), for example).

SUMMARY

When surface finishing is performed on an outer or inner ring of a rolling bearing by grinding, the outer and inner peripheries and axial end faces need to be ground in different steps. Thus, grinding apparatus must be changed or different work holders must be used in different steps. In addition, because the work may have large strain that results from a preceding process such as heat treatment, a multistep grinding process in which rough grinding is performed to remove large strain prior to finish grinding is required. This causes an increase in the number of working processes for surface finishing and thus an increase in production cost.

The inventors of this application thought of performing surface finishing on a work by cutting such as hard-turning instead of grinding for reduction of production cost. If this is realized, because an inner periphery or outer periphery and an axial end face of a work can be machined simultaneously, for example, and because finishing can be directly performed on the work without the need for rough grinding, the number of working processes can be reduced.

However, to achieve a desired machining accuracy by finishing by cutting, the work must be held securely so as to withstand the load that is applied thereto during the machining. The work can be securely held if a magnetic chuck is used to attract the entire circumference of one axial end face of the work as in a conventional apparatus. However, when the work has strain, the work may be changed in shape in such a way that the strain of the work is corrected by the attractive force of the magnetic chuck. When cutting is performed on the work with its strain corrected, the corrected strain returns when the work is removed from the magnetic chuck after the machining. As a result, the strain cannot be removed completely. The problem of correction and return of strain is more significant as strain that develops in the work during a preceding process is greater, and is a great obstacle when finishing is directly performed on a work without rough machining.

The disclosure provides a work holder and a work machining method by which a work can be held stably without the fear of deformation.

A work holder according to a first aspect of the disclosure includes: a first holding part having three attracting members that are arranged circumferentially apart from each other to attract an axial end face of an annular work; and a second holding part having a contacting member that is held in contact with an inner periphery or outer periphery of the work and restricts radial movement of the work.

In the work holder with the above configuration, the first holding part uses the three attracting members to hold the axial end face of the work at three points. Thus, compared to the case where the entire circumference of the axial end face of the work is attracted, the work is less likely to be straightened and strain of the work can be appropriately removed by surface machining. In addition, because the first holding part holds the axial end face of the work at three points, the work can be held in a stable posture and prevented from jolting. In addition, the work holder of the disclosure, which is provided with the second holding part that restricts radial movement of the work, can provide holding force necessary to machine the work with sufficient machining accuracy even if the holding force is smaller compared to the case where the entire circumference of the axial end face of the work is held.

In the above aspect, the second holding part may include a supporting member that supports the contacting member for movement in a radial direction of the work, and an actuating member that applies a force that is directed in a radially outward or inward direction of the work to the contacting member. This configuration ensures close contact of the contacting member with the inner periphery or outer periphery of the work.

In the above configuration, the second holding part may include a locking member that locks the contacting member radially in position in contact with the inner periphery or the outer periphery of the work. This configuration ensures restriction of radial movement of the work and enables the work to be machined with higher accuracy.

In the above configuration, the locking member may be actuated by fluid pressure. This configuration enables an operation to lock the contacting member to be performed from a location remote from the contacting member.

In the above aspect, a central angle between the two adjacent attracting members may be set to be within a range of 90° to 150°. This configuration ensures that the work is stably supported.

A work machining method according to a second aspect of the disclosure is a method for machining a surface of an annular work using the work holder. The work machining method includes: allowing the three attracting members of the first holding part to attract a first axial end face of the work; bringing the contacting member of the second holding part into contact with the inner periphery or outer periphery of the work to restrict radial movement of the work and hold the work in position; and machining a surface of the work.

According to the disclosure, the work can be held stably without the possibility of deforming the work.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
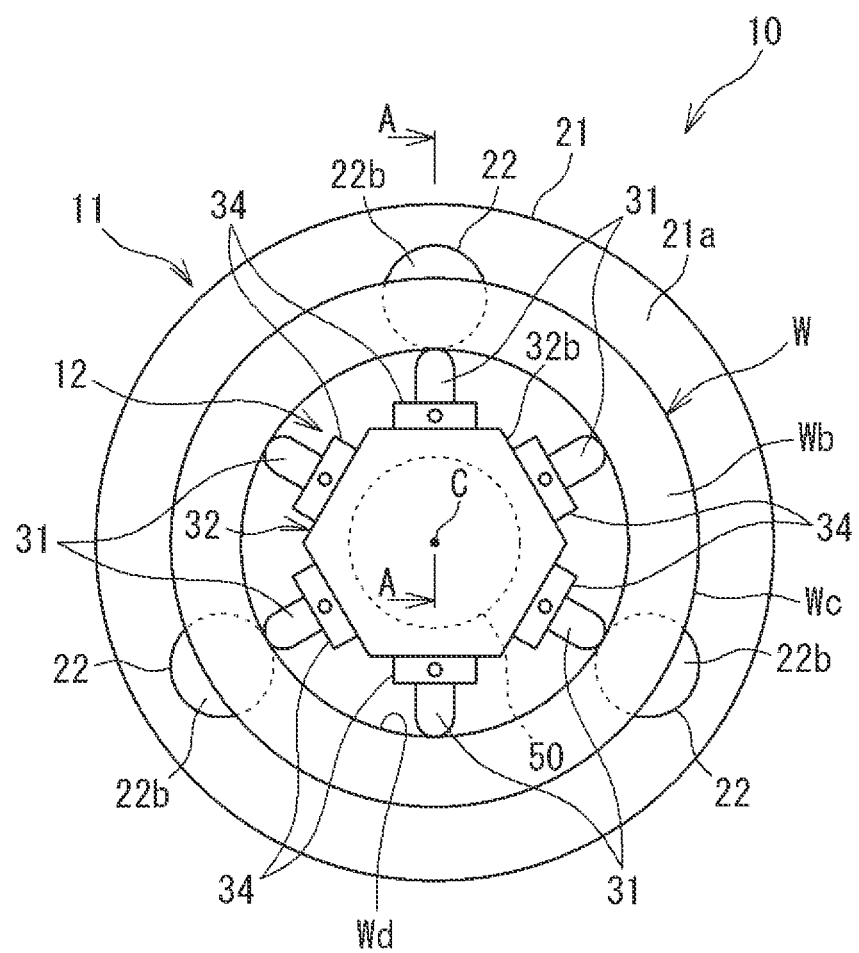
FIG. 1 is a front view of a work holder according to a first embodiment.
Figure 2:
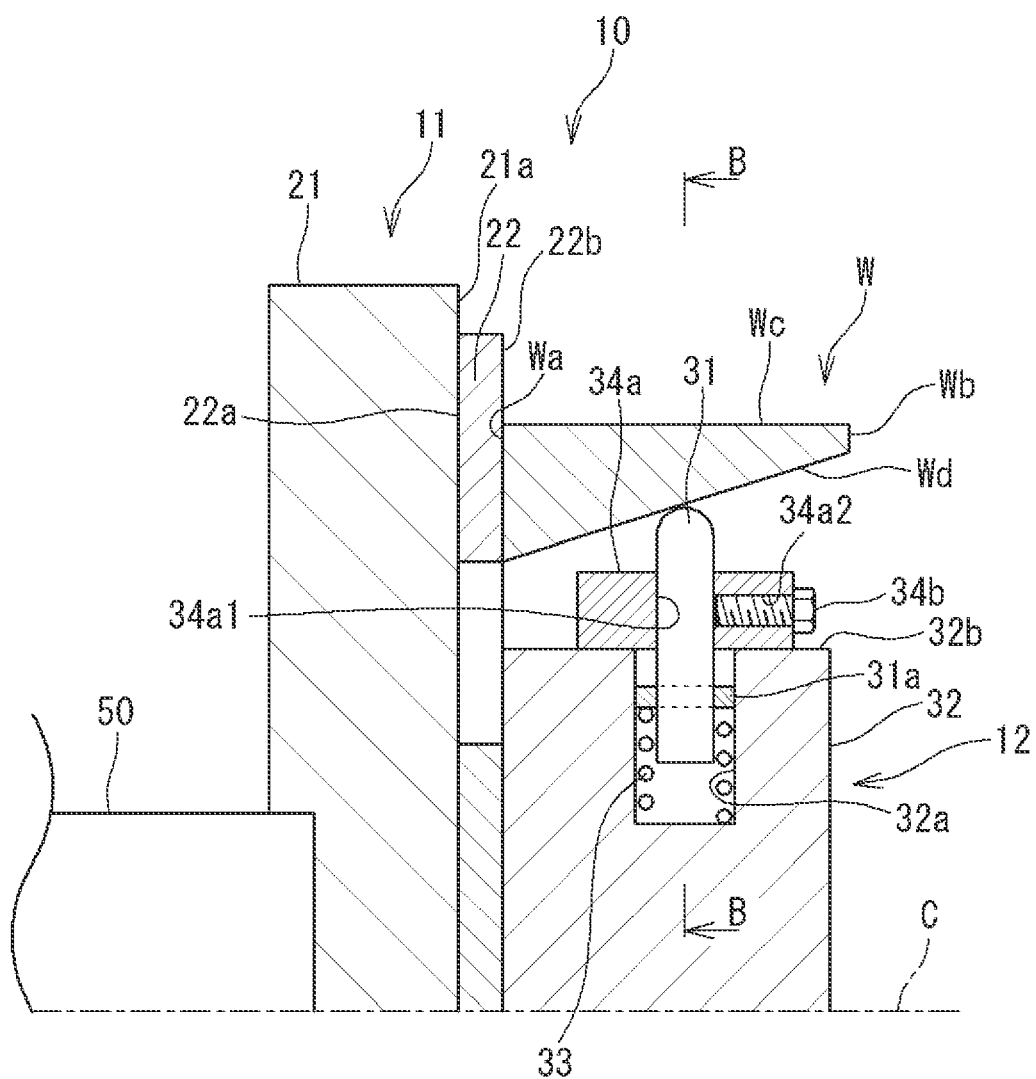
FIG. 2 is a cross-sectional view that is taken along a line A-A of FIG. 1.
Figure 3:
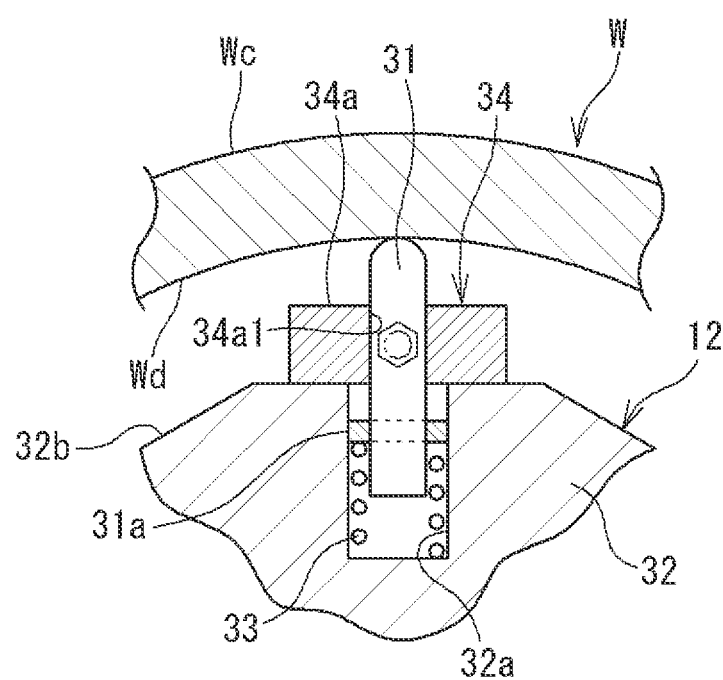
FIG. 3 is a cross-sectional view that is taken along a line B-B of FIG. 2.

Embodiments of the disclosure are hereinafter described with reference to the drawings. FIG. 1 is a front view of a work holder according to a first embodiment. FIG. 2 is a cross-sectional view that is taken along a line A-A of FIG. 1, and FIG. 3 is a cross-sectional view that is taken along a line B-B of FIG. 2. A work holder 10 of the first embodiment is primarily applied to a cutting apparatus, such as a hard-turning apparatus, in which a cutting tool having a high hardness is used to cut a surface of a work. The work holder 10 is mounted on a main spindle 50 of a cutting apparatus when used.

A work W that is held by the work holder 10 is an annular member, such as an outer ring or inner ring of a rolling bearing. In FIG. 1 to FIG. 3, an outer ring of a conical roller bearing is shown as one example of the work W. When the term "radial" is simply used in the following description, it means a radial direction of the work W. The work holder 10 of the first embodiment is in particular used to cut axial end faces Wa, Wb and an outer periphery Wc of the work W. A work holder of a second embodiment, which is described later, is used to cut an inner periphery Wd of the work W.

The work holder 10 includes a first holding part 11 and a second holding part 12. The first holding part 11 includes a magnetic chuck 21 and attracting members 22. The magnetic chuck 21 is disk-shaped, and coupled to an end of the main spindle 50 of the cutting apparatus. The magnetic chuck 21 has a center C that is positioned to coincide with an axis of the main spindle 50. The magnetic chuck 21 rotates, together with the main spindle 50, about the axis of the main spindle 50, in other words, about its own center C. The magnetic chuck 21 has a first lateral face that serves as an attracting face 21a that attracts a magnetic material with permanent magnets or electromagnets.

The attracting members 22 have the shape of a circular disk, and are made of a ferromagnetic material that becomes magnetized when attracted to the magnetic chuck 21. Each attracting member 22 is attracted and attached at a first lateral face 22a to the attracting face 21a of the magnetic chuck 21. Each attracting member 22 also has a second lateral face 22b that serves as a work attracting face 22b that attracts the work W.

Three attracting members 22 are arranged circumferentially apart from each other around the center C of the magnetic chuck 21. More specifically, three attracting member 22 are arranged circumferentially at regular intervals, in other words, at a central angle of 120° to each other. The work W is attracted to the work attracting face 22b of the attracting members 22, thereby being held at three points on the first holding part 11. The work W is held on the first holding part 11 with its center coincident with the center C of the magnetic chuck 21.

Figure 4:
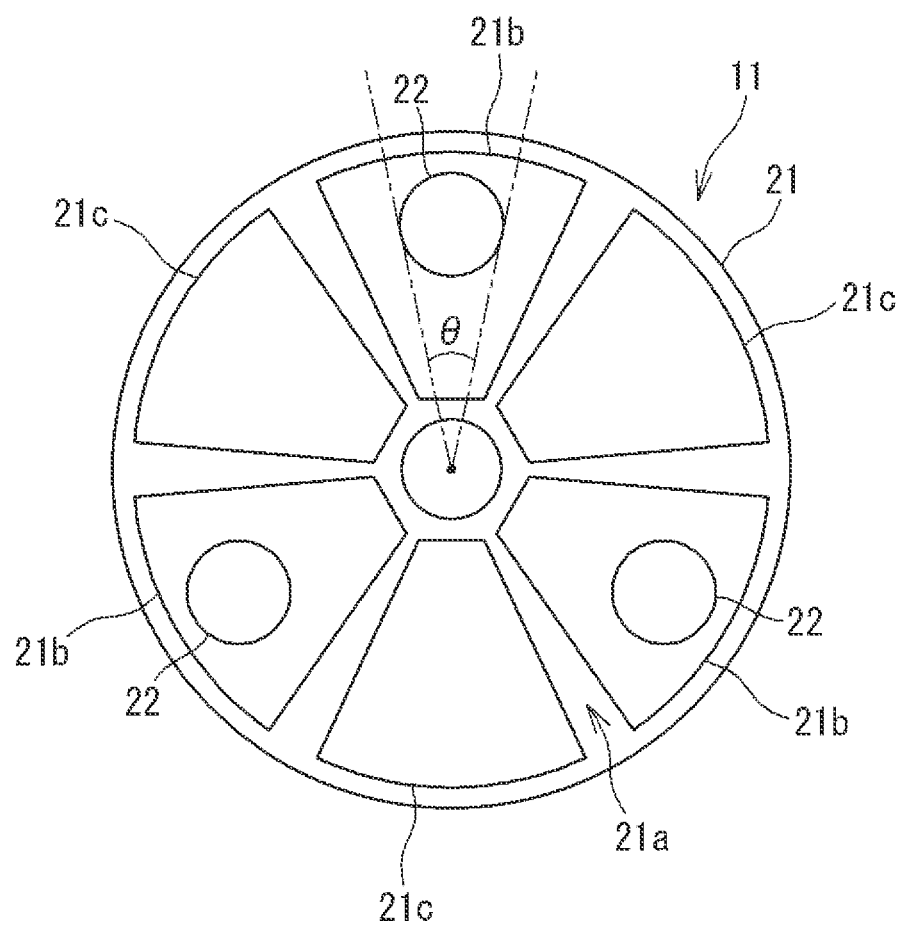
FIG. 4 is a front view that illustrates a relationship between magnetic poles of a magnetic chuck and attracting members.

As shown in FIG. 4, magnet members 21b, 21c are arranged circumferentially in the attracting face 21a of the magnetic chuck 21 with their magnetic poles (N- and S-poles) alternately reversed. Each attracting member 22 has a circumferential width that is small enough to fit in one magnet member 21b or 21c, and is provided in such a range that it fits in one magnet member 21b or 21c and does not extend across two magnet members 21b, 21c. The attracting members 22 are set to have a circumferential width that corresponds to a central angle θ of 60° or smaller, for example.

As shown in FIG. 1 to FIG. 3, the second holding part 12 is placed inside an inner periphery of the work W, which has been attracted to the first holding part 11, and holds the inner periphery Wd of the work W from radially inside thereof. The second holding part 12 has contacting members 31, a supporting member 32, actuating members 33, and locking members 34. The contacting members 31 are pins that have the shape of a circular cylinder with a spherically rounded tip. The tip of each contacting member 31 is brought into contact with the inner periphery Wd of the work W to restrict radial movement of the work W. A plurality of contacting members 31 are arranged apart from each other in a circumferential direction of the work W. In this embodiment, six contacting members 31 are arranged circumferentially at regular intervals.

The supporting member 32 supports the contacting members 31 for movement in a radial direction of the work W. The supporting member 32 has a hexagonal shape as viewed from front. Thus, the supporting member 32 has an outer periphery 32b that is formed of six flat faces. The supporting member 32 is located with its central axis coincident with the center C of the magnetic chuck 21. The supporting member 32 rotates about the center C together with the main spindle 50 and the first holding part 11.

Each of the six flat faces that form the outer periphery 32b of the supporting member 32 has a supporting hole 32a that supports a contacting member 31. Each supporting hole 32a extends perpendicularly to the outer periphery 32b of the supporting member 32. The contacting members 31 are slidably inserted in the supporting holes 32a with their tips protruding from the supporting holes 32a.

The actuating members 33 apply a radially outward force to the contacting members 31. The actuating members 33 in this embodiment are biasing members, such as coil springs, that are fitted on the contacting members 31 in the supporting holes 32a. Each actuating member 33 has a first end in contact with the bottom of the corresponding supporting hole 32a, and a second end in contact with a spring receiving member 31a that is provided on a longitudinal intermediate portion of the corresponding contacting member 31. Thus, the contacting members 31 are biased in a direction out of the supporting holes 32a, in other words, in a radially outward direction of the work W, by the actuating members 33. Thus, the contacting members 31 are held in contact with the inner periphery Wd of the work W, which has been attracted to the first holding part 11, by biasing forces of the actuating members 33. The biasing forces of the actuating members 33 are set to the minimum necessary to hold the contacting members 31 in contact with the inner periphery Wd of the work W. Thus, there is no possibility that the work W is deformed by the biasing forces of the actuating members 33.

Each locking member 34 includes a fixing block 34a that is provided on the outer periphery 32b of the supporting member 32, and a pressing member 34b that is attached to the fixing block 34a. The fixing block 34a has a supporting hole 34a1 that extends through it in a radial direction of the work W, and the supporting hole 34a1 is in communication with the corresponding supporting hole 32a of the supporting member 32. The fixing block 34a also has a screw hole 34a2 that extends in a direction perpendicular to the supporting hole 34a1. The screw hole 34a2 has a first end that opens in the supporting hole 34a1, and a second end that opens in an outer face of the fixing block 34a.

The pressing member 34b is constituted of a bolt or the like that is threadably inserted in the corresponding screw holes 34a2. An end of the pressing member 34b enters the supporting hole 34a1 from the screw hole 34a2 and presses an outer face of the contacting member 31 in the supporting hole 34a1. As a result, the contacting member 31 is locked radially in position, and the tip of the contacting member 31 is held in contact with the inner periphery Wd of the work W.

A magnetic chuck attracts the entire circumference of an axial end face of the work W in a conventional work holder, whereas the work holder 10 of this embodiment attracts an axial end face of the work W at three points with the three attracting members 22. An outer or inner ring or the like of a rolling bearing may have strain that is attributable to a preceding process, such as heat treatment, that has been carried out prior to surface finishing. When a first axial end face (one axial end face) of a work with strain is attracted to the magnetic chuck of the conventional work holder, the work is straightened in conformity with an attracting face of the magnetic chuck. Even when a second axial end face (the other axial end face) of the work W is machined flat in this state, the corrected strain returns when the work is removed from the magnetic chuck. Consequently, strain also develops in the machined second axial end face.

In this embodiment, the first axial end face Wa of the work W is attracted to the first holding part 11 at three points. Thus, even when the work W has strain that is attributable to a preceding process, the work W is less likely to be straightened and the second axial end face Wb can be machined with the strain remaining. Thus, the strain can be suitably removed from the work W, and the second axial end face Wb of the work W can be cut to a desired flatness. In addition, because the first axial end face Wa of the work W is attracted at three points, the posture of the work W can be stabilized without fear of the work jolting and tilting.

The posture of the work W can be stabilized even when the first axial end face Wa of the work W is attracted at four or more points. In this case, however, because three attraction points are sufficient to fix the posture of the work W to some extent, the one or more additional attraction points may increase the possibility that the work W is straightened in shape to a strain-free state. Thus, attracting the work W at three points is highly effective in stabilizing the posture of the work and preventing deformation of the work.

In addition, when the first axial end face Wa of the work W is attracted to the first holding part 11 at three points, the force to hold the work W may decrease compared to the case where the entire circumference of the first axial end face of the work is attracted. This is the reason why the work holder 10 of this embodiment includes the second holding part 12, which has a plurality of contacting members 31 that supports the inner periphery Wd of the work W from radially inside. The second holding part 12 can compensate for the decrease in holding force of the first holding part 11 and receive radial forces that are applied to the work W during cutting. Thus, the work holder 10 of this embodiment can hold the work W securely and enables the work W to be cut with a desired machining accuracy.

One example of a method for machining a work W using the work holder 10 of this embodiment is described. First, the first axial end face Wa of the work W is held by the work holder 10, and the second axial end face Wb of the work W is cut flat by a cutting apparatus. After the second axial end face Wb of the work W is cut flat, the work W is removed from the work holder 10 and the second axial end face Wb of the work W is held by the work holder 10. Because the second axial end face Wb of the work W has been already machined to a flat face without strain, there is no strain that is corrected when the work W is attracted to the first holding part 11. In addition, because the second axial end face Wb of the work W has been already machined to a flat face without strain, the entire circumference of the second axial end face Wb of the work W may be attracted to an attracting face 21a of a magnetic chuck 21 that includes no attracting members 22.

After the second axial end face Wb of the work W is held, the first axial end face Wa and the outer periphery Wc of the work W are cut. These faces can be cut simultaneously or continuously without changing the cutting apparatus and the work holder 10. Thus, the machining time can be reduced and the number of working processes can be decreased. Because the second axial end face Wb of the work W has been machined to a flat face without strain, the first axial end face Wa of the work W can be also machined to a flat face without strain and, consequently, the degree of parallelism between the first and second axial end faces Wa and Wb can be improved.

As described above, the work holder 10 of the first embodiment can be used to cut the surfaces of the work W except the inner periphery Wd thereof. A work holder according to a second embodiment that is described below is used to cut the inner periphery Wd of the work W.

Figure 5:
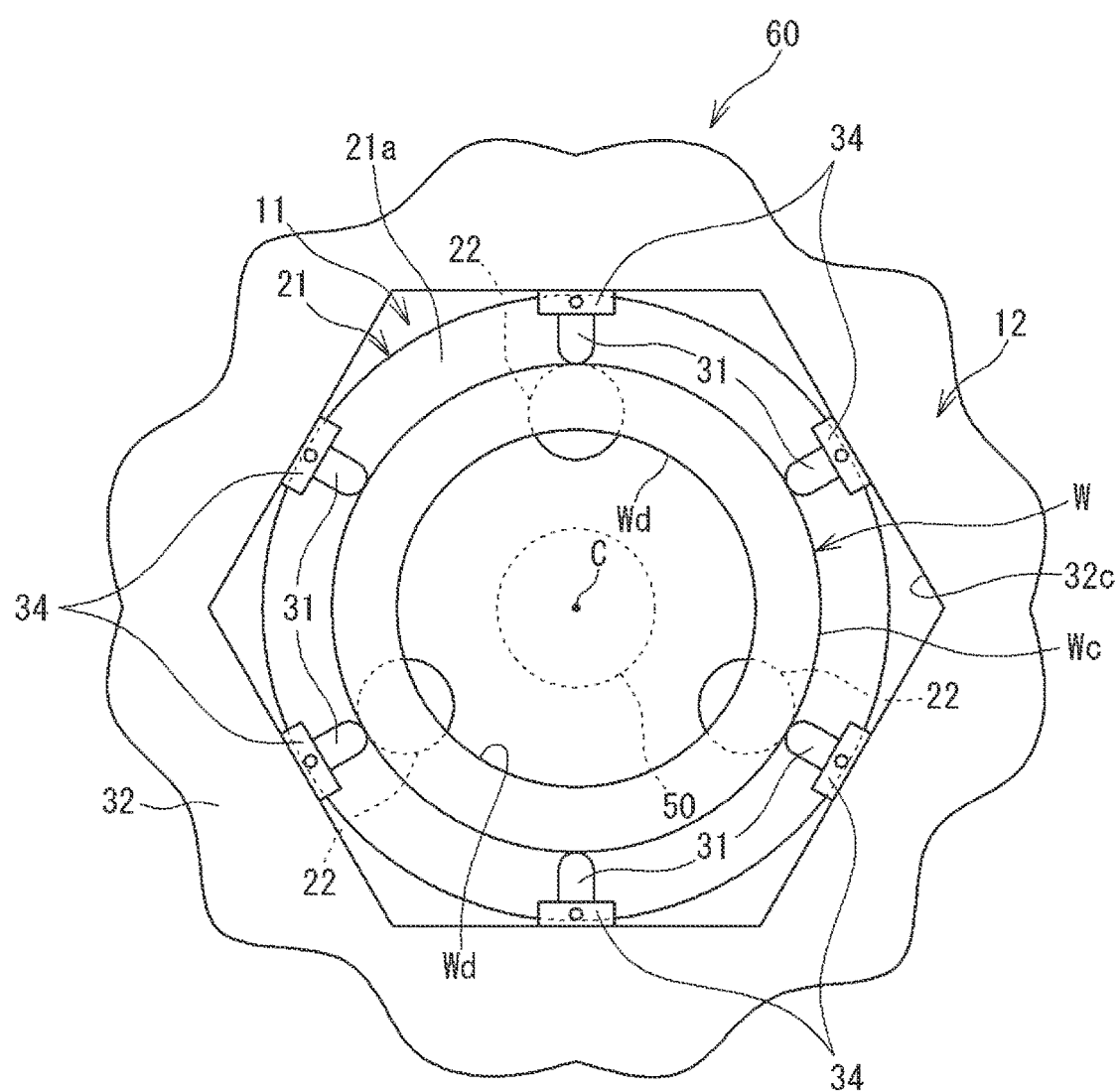
FIG. 5 is a front view of a work holder according to a second embodiment.

FIG. 5 is a front view that illustrates the work holder according to the second embodiment. A work holder 60 of this embodiment includes a first holding part 11 and a second holding part 12 as in the case of the work holder 10 of the first embodiment. The first holding part 11 has almost the same configuration as that of the first embodiment, and includes three attracting members 22 in the attracting face 21a of the magnetic chuck 21. The second holding part 12 includes a plurality of contacting members 31 that are held in contact with the outer periphery Wc of the work W, which has been held on the first holding part 11, a supporting member 32 that supports the contacting members 31, actuating members that apply radially inward forces to the contacting members 31, and locking members 34 that lock the radial positions of the contacting members 31.

The supporting member 32 is an annular member that is placed radially outside the work W. The supporting member 32 has a hexagonal inner periphery 32c. Thus, the inner periphery 32c of the supporting member 32 is formed of six flat faces. Although not shown, the inner periphery 32c of the supporting member 32 has supporting holes in which the contacting member 31 are inserted for sliding movement in a radial direction of the work W, and the actuating members are provided in the supporting holes. The contacting members 31 are held in contact with the outer periphery Wc of the work W by biasing forces of the actuating members, and locked radially in position by the locking members 34. The supporting holes, the actuating members, and the locking member 34 have the same specific configuration as those in the first embodiment.

The work holder 60 of the second embodiment attracts an axial end face of the work W to the first holding part 11 at three points, and holds the outer periphery Wc of the work W on the second holding part 12 to restrict radial movement of the work W. Thus, the work holder 60 can hold the work W securely and enables the inner periphery Wd of the work W to be cut with a desired machining accuracy.

In the above description, the axial end faces Wa, Wb and the outer periphery Wc of the work W are cut using the work holder 10 of the first embodiment before the inner periphery Wd of the work W is cut using the work holder 60 of the second embodiment. In contrast to this, however, the axial end faces Wa, Wb and the inner periphery Wd of the work W may be cut using the work holder 60 of the second embodiment before the outer periphery Wc of the work W is cut using the work holder 10 of the first embodiment.

Figure 6:
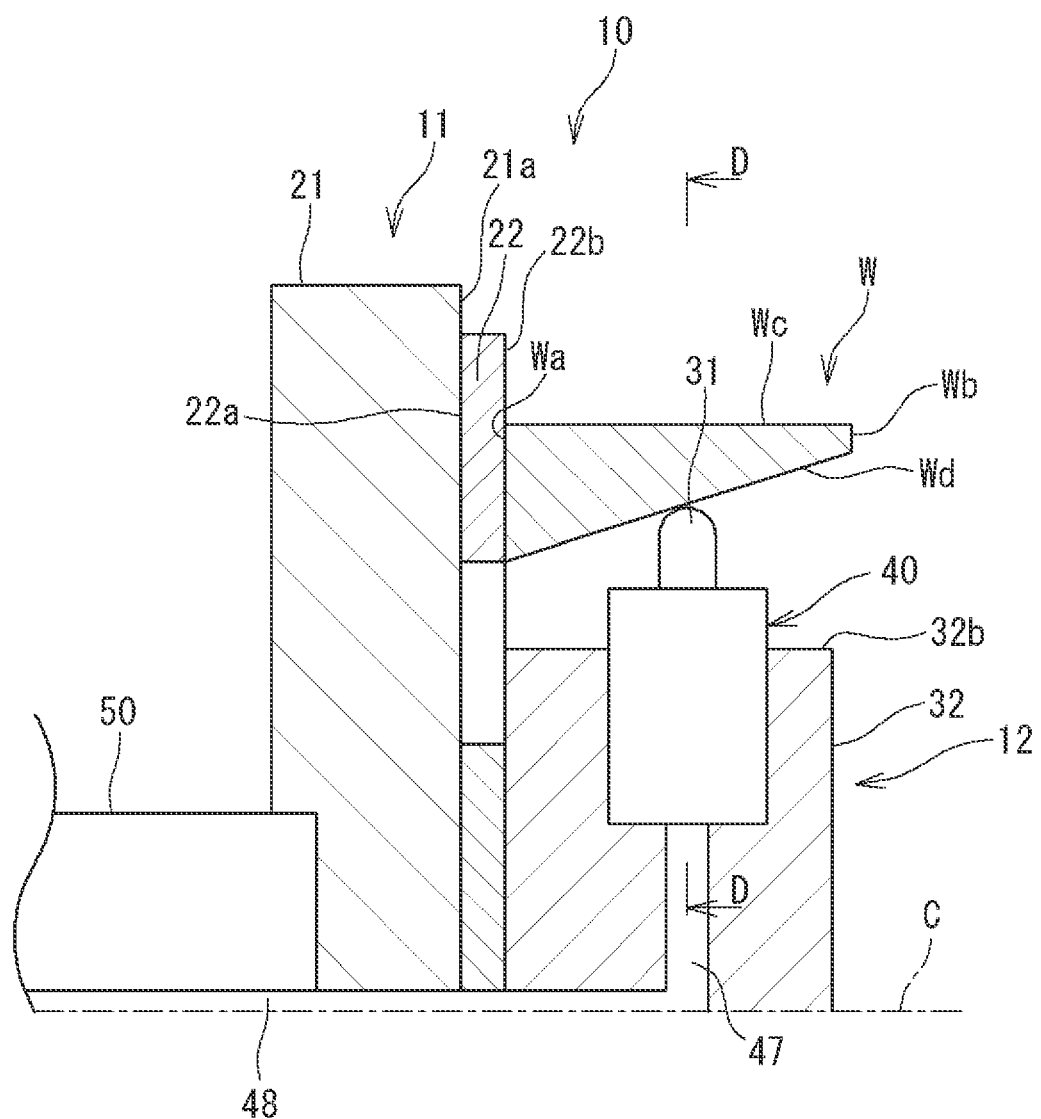
FIG. 6 is a cross-sectional view corresponding to FIG. 2 that illustrates a work holder according to a third embodiment.

FIG. 6 is a cross-sectional view corresponding to FIG. 2 that illustrates a work holder according to a third embodiment. A work holder 10 of this embodiment is different in configuration of the second holding part 12 from the work holder 10 of the first embodiment. Specifically, in the second holding part 12 of this embodiment, a contacting member 31, an actuating member and a locking member are integrated as one holding unit 40, and a plurality of holding units 40 is attached to the supporting member 32.

Figure 7:
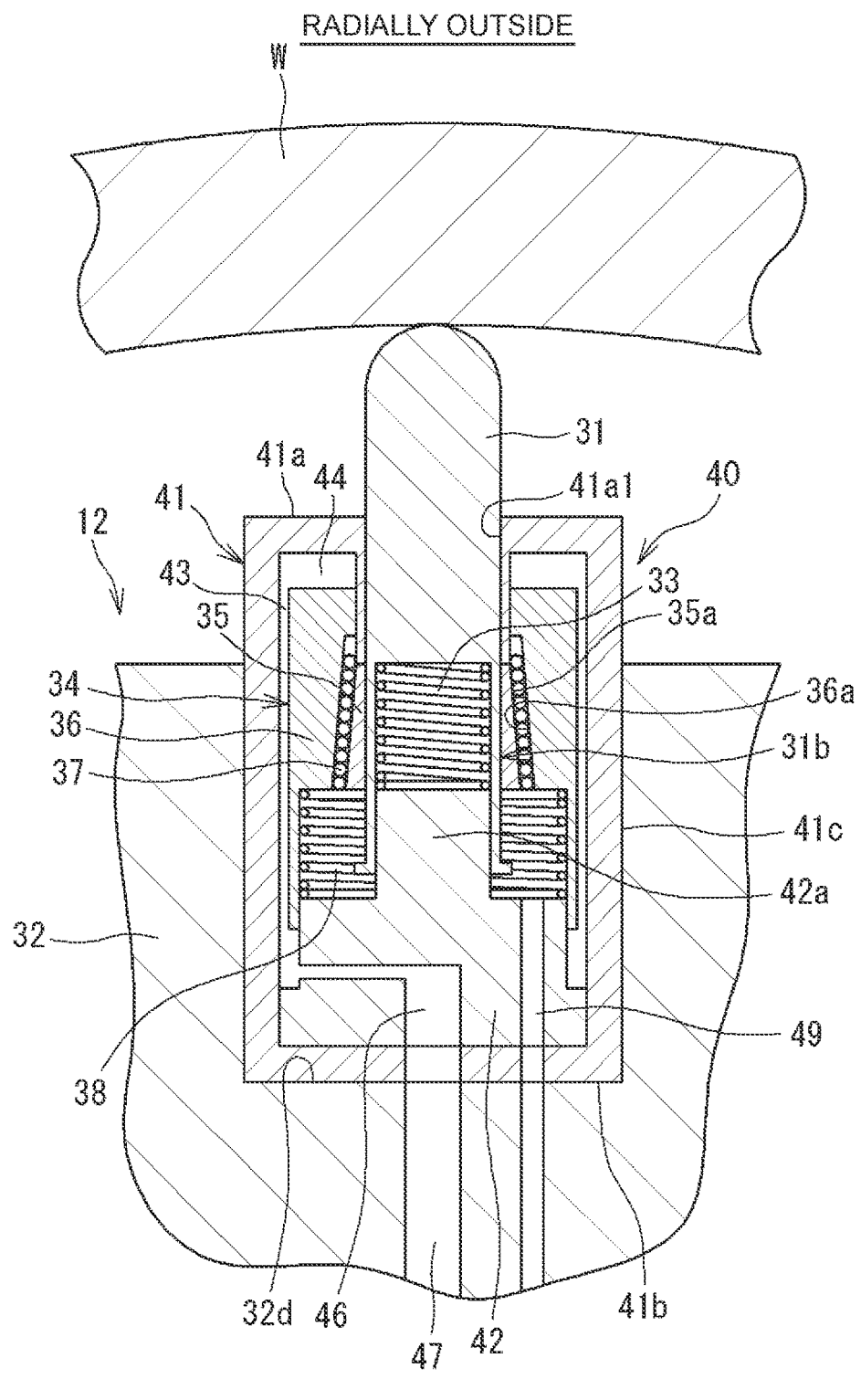
FIG. 7 is a cross-sectional view that is taken along a line D-D of FIG. 6.

FIG. 7 is a cross-sectional view that is taken along a line D-D of FIG. 6. The upper side of FIG. 7 corresponds to the radially outside of the work W, and the lower side of FIG. 7 corresponds to the radially inside of the work W. The supporting member 32 has attaching holes 32d in its outer periphery that open radially outward and extend in a radial direction. Each holding unit 40 includes a casing 41 that houses a contacting member 31, an actuating member 33 and a locking member 34, and the casing 41 is inserted in the corresponding attaching hole 32d and attached to the supporting member 32.

The casing 41, which has the shape of a circular cylinder, has a top wall 41a that is located radially outside, a bottom wall 41b that is located radially inside, and a side wall 41c that is located between the top wall 41a and the bottom wall 41b. The top wall 41a has an opening 41a1 that allows a pin as the contacting member 31 to protrude. The contacting member 31 is spherically rounded at a radially outer end (distal end) and has a cylindrical portion 31b with the shape of a cylinder that forms its radially inner portion (proximal portion).

A guide member 42 that guides radial movement of the contacting member 31 is provided at a radially inside part in the casing 41. The guide member 42 includes a guide portion 42a that is inserted in the cylindrical portion 31b of the contacting member 31 from radially inside. The contacting member 31 is movable radially along the guide portion 42a. In the cylindrical portion 31b of the contacting member 31, a biasing member that serves as the actuating member 33, such as a coil spring, is interposed between a radially outer end of the cylindrical portion 31b and a radially outer end of the guide portion 42a. The contacting member 31 is biased radially outward by the actuating member 33.

The locking member 34 is actuated by fluid pressure. Specifically, the locking member 34 includes an annular gripping member 35 that is located on an outer periphery of the contacting member 31, an annular piston member 36 that is located on an outer periphery of the gripping member 35, a plurality of rolling elements 37, such as steel balls, that is disposed between the gripping member 35 and the piston member 36, and return springs 38 that are provided between the piston member 36 and the guide member 42. The gripping member 35 has a generally C-shaped cross-section that is formed by cutting away a circumferential portion thereof, and is elastically deformable to increase or decrease its inside diameter.

The gripping member 35 has a tapered outer periphery 35a that increases in outer diameter radially inward (toward the bottom of FIG. 7). The piston member 36, which is located on an outer periphery of the gripping member 35, has a tapered inner periphery 36a that increases in inside diameter radially inward (toward the bottom of FIG. 7).

The piston member 36 is slidable radially along an inner periphery of the side wall 41c of the casing 41. Because the outer periphery 35a of the gripping member 35 and the inner periphery 36a of the piston member 36 are tapered as described above, when the piston member 36 is moved radially inward, the outer periphery 35a of the gripping member 35 is pressed by the inner periphery 36a of the piston member 36 and the inside diameter of the gripping member 35 decreases. Then, the gripping member 35 is pressed tightly around the contacting member 31 and the contacting member 31 is locked radially in position.

A flow passage 43 through which air can flow is provided between an outer periphery of the piston member 36 and an inner periphery of the side wall 41c of the casing 41. The flow passage 43 may be formed of a gap that is provided between the piston member 36 and the side wall 41c or one or more grooves in the piston member 36 or the side wall 41c. An air chamber 44 that is in communication with the flow passage 43 is defined between a radially outer end face of the piston member 36 and an inner face of the top wall 41a of the casing 41.

An air passage 46 extends through the guide member 42 and the bottom wall 41b of the casing 41 so that compressed air can be supplied to the air chamber 44 through the flow passage 43. An air passage 47 that is in communication with the air passage 46 also extends in the supporting member 32. As shown in FIG. 6, the air passage 47 extends radially inward in the supporting member 32 to the center C, and is bent toward the magnetic chuck 21 along the center C.

Figure 8:
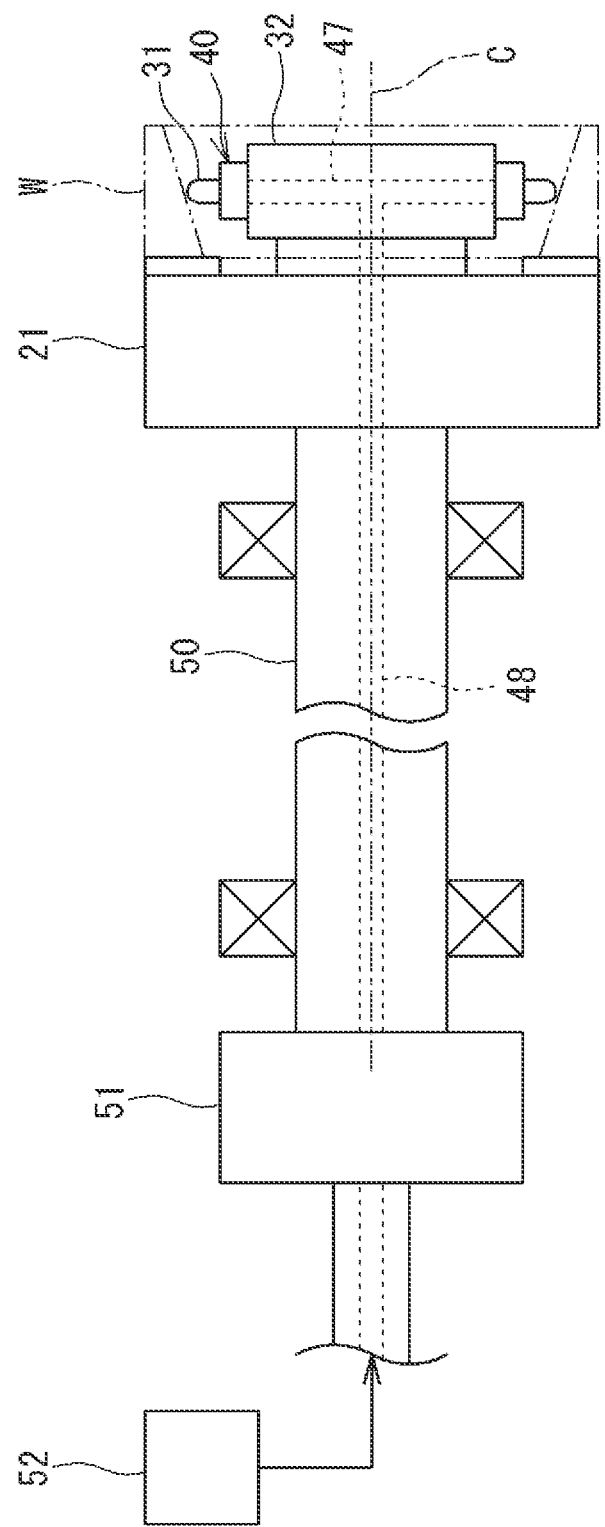
FIG. 8 is an explanatory side view that illustrates an air supply route in a work holder.

FIG. 8 is a side view that illustrates an air supply route in the work holder 10. An air passage 48 extends along the axis of the main spindle 50 and along the center C of the magnetic chuck 21, and the air passage 48 is in communication with the air passage 47 in the supporting member 32. The air passage 48 is in connection with a compressed air supply source 52 via a rotary joint 51.

Because the air passage 48 in the main spindle 50 and the magnetic chuck 21 extends along the axis of the main spindle 50 (the center C of the magnetic chuck 21), the air passage 48 does not change in position even when the main spindle 50 rotates. In addition, because the air passage 48 is in connection with the compressed air supply source 52 via the rotary joint 51 in a relatively rotatable manner, the compressed air that is supplied from the compressed air supply source 52 can be supplied even while the main spindle 50 is rotating.

The compressed air from the compressed air supply source 52 is supplied through the air passages 48, 47, 46 and then through the flow passage 43 between the side wall 41c of the casing 41 and the piston member 36, which is shown in FIG. 7, into the air chamber 44, and presses the piston member 36 radially inward. Then, the inside diameter of the gripping member 35 is decreased to lock the contacting member 31 radially in position. When the supply of compressed air is stopped, the piston member 36 is pushed back radially outward by the return springs 38. Then, the inside diameter of the gripping member 35 is increased again to unlock the contacting member 31.

A vent hole 49 through which the air in the space that is defined by the piston member 36, the contacting member 31 and the guide member 42 can be discharged extends through the guide member 42, the bottom wall 41b of the casing 41, and the supporting member 32.

In this embodiment, the contacting members 31 can be locked radially in position automatically by controlling the operation of the compressed air supply source 52 from a location remote from the contacting members 31. Thus, there is no need to operate the pressing members 34b directly and manually in the vicinity of the contacting members 31 as in the first embodiment. Thus, the step of holding the work W can be automated. This contributes to the reduction of the number of working processes and makes this embodiment applicable to mass production facilities. In addition, because the contacting members 31, the actuating members 33 and the locking members 34 are integrated as the holding unit 40, the holding units 40 can be easily attached to the supporting member 32 and the maintenance work, such as replacement, can be facilitated.

In the third embodiment, a hydraulic pressure supply source may be used in place of the compressed air supply source 52. In this case, hydraulic pressure is used to move the piston member 36 radially inward to decrease the inside diameter of the gripping member 35. In addition, the configuration of the second holding part 12 of the work holder 10 of the third embodiment is also applicable to a holding part that holds a work W by holding the contacting members 31 in contact with an outer periphery thereof, such as the second holding part 12 of the work holder 60 of the second embodiment.

The disclosure is not limited to the above embodiments, and can be modified within the scope of the disclosure that is described in the claims. For example, the center C of the first holding part 11 may extend either horizontally or vertically. The attracting members 22 are not necessarily have the shape of a circular disk, and may be formed of plate materials with a rectangular shape.

The number of the contacting members 31 is not specifically limited and may be five or less, or seven or more. However, the number of the contacting members 31 is preferably three or more to restrict radial movement of the work W reliably. The three attracting members 22 are not necessarily arranged circumferentially at regular intervals. However, a central angle in a range of at least 120°±30° (90° to 150°) is preferably set between two adjacent attracting members 22 to ensure stable support of the work W.

While each actuating member 33 is formed of a biasing member, such as a coil spring in the above embodiment, fluid pressure, such as hydraulic pressure, may be used to apply a radially outward or inward force to the contacting members 31. For example, the compressed air supply source 52 in the third embodiment or an alternative hydraulic pressure supply source may be used to apply a radially outward or inward force to the contacting members 31.

The work holder of the disclosure can be used not only to hold outer or inner rings of rolling bearings but also to hold any annular work. In addition, the work holder of the disclosure can be used not only for work cutting but also other machining such as grinding.

What is claimed is:

1. A work holder comprising:
   a first holding part including three attracting members that are arranged circumferentially apart from each other to attract an axial end face of an annular work; and
   a second holding part including:
   (i) a contacting member that is held in contact with an inner periphery or outer periphery of the work and restricts radial movement of the work; and
   (ii) a biasing member configured to apply a biasing force to the contacting member, the biasing force directed toward the work in a radial direction,
   wherein the biasing member is an elastic member elastically biasing the contacting member.

2. The work holder according to claim 1, wherein the second holding part includes a supporting member that supports the contacting member for movement in a radial direction of the work.

3. The work holder according to claim 2, wherein the second holding part includes a locking member that locks the contacting member radially in position in contact with the inner periphery or the outer periphery of the work.

4. The work holder according to claim 3, wherein the locking member is actuated by fluid pressure.

5. The work holder according to claim 1, wherein a central angle between two adjacent attracting members is set to be within a range of 90° to 150°.

6. A work machining method for machining a surface of an annular work using the work holder according to claim 1, the work machining method comprising:
   allowing the three attracting members of the first holding part to attract a first axial end face of the work;
   bringing the contacting member of the second holding part into contact with the inner periphery or outer periphery of the work to restrict radial movement of the work and hold the work in position; and
   machining a surface of the work.

7. The work holder according to claim 1, wherein the first holding part includes a magnetic member.

8. The work holder according to claim 7, wherein the attracting members are configured to become magnetized by being attracted to the magnetic member.

9. The work holder according to claim 1, wherein the biasing member is a coil spring.

10. The work holder according to claim 1,
    wherein the second holding part includes a locking member that locks the contacting member radially in position in contact with the inner periphery or the outer periphery of the work, the locking member being actuated by fluid pressure,
    wherein the locking member includes a gripping member, and
    wherein the locking member is configured to lock the contacting member by pressing the gripping member to the contacting member when the locking member is actuated by the fluid pressure.

* * * * *